May 12, 1959
R. N. SECORD
2,886,414
PROCESS FOR PRODUCING FINELY-DIVIDED SILICA
Filed June 7, 1955
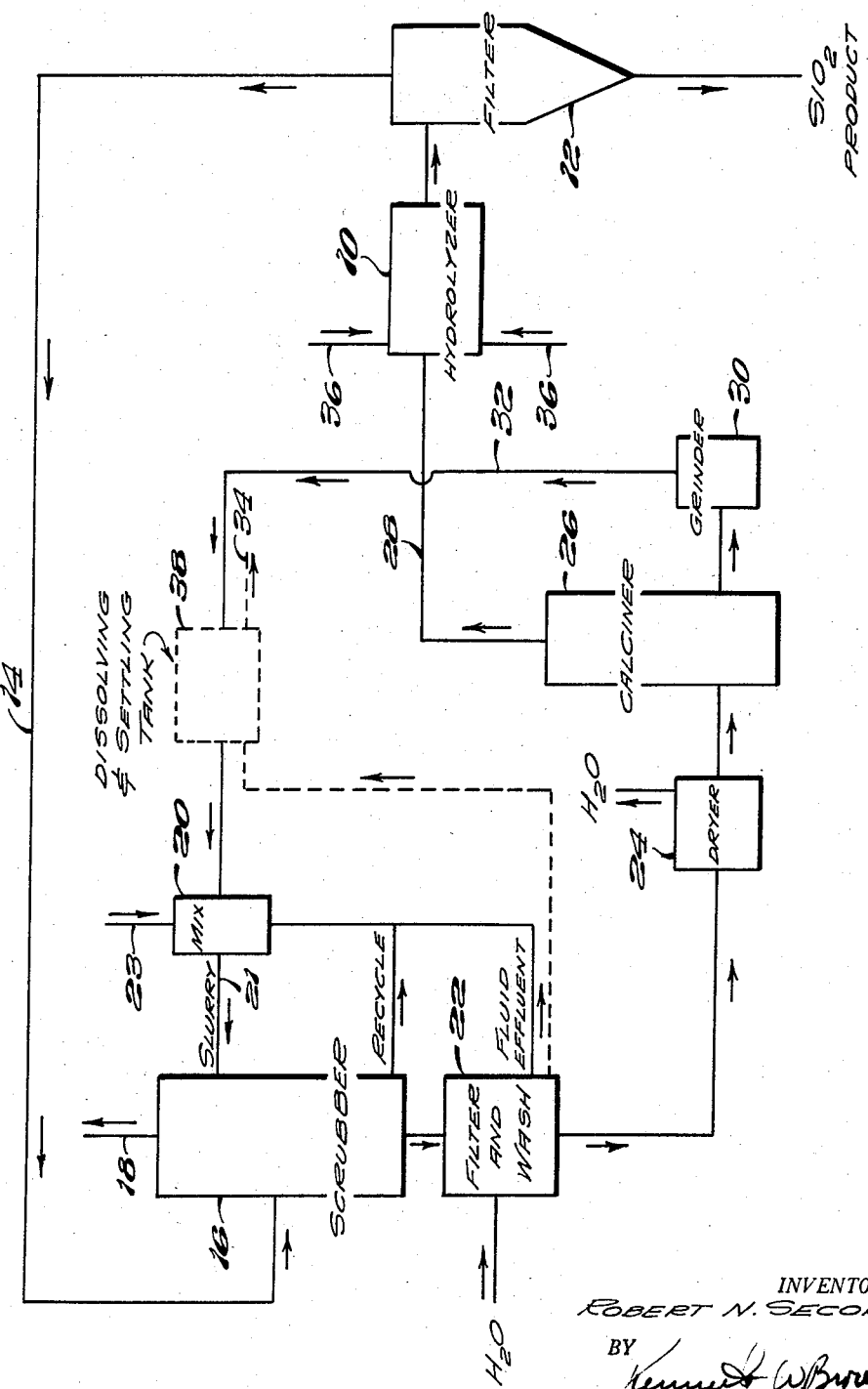
INVENTOR.
Robert N. Secord
BY

United States Patent Office 2,886,414
Patented May 12, 1959

2,886,414
PROCESS FOR PRODUCING FINELY-DIVIDED SILICA

Robert N. Secord, North Reading, Mass., assignor to Godfrey L. Cabot, Inc., Boston, Mass., a corporation of Massachusetts Application June 7, 1955, Serial No. 513,839

10 Claims. (Cl. 23—182)

This invention relates to a process for producing finely-divided silica from abundant, normally relatively coarse siliceous materials and includes within its scope a novel process for recovering by-product fluorides for reuse in the process. More particularly, this invention relates to a novel process comprising the steps of converting a siliceous raw material to silicon tetrafluoride, hydrolyzing the silicon tetrafluoride to silica, recovering the by-product fluorides and reacting these recovered fluorides with additional siliceous raw material to produce dry silicon tetrafluoride for the hydrolysis reaction, in continuous flow. This invention is in certain respects an improvement over that of U.S. Patent No. 2,631,083 of Engelson and myself in that by this new process a wide variety of abundant and hence relatively inexpensive siliceous raw materials may be employed and the fluoride by-products may be safely and more efficiently recovered for reuse.

A primary objective of this invention is, therefore, to provide a safer and more effective method of recovering and reusing volatile fluorides from the tail gas stream from the vapor phase hydrolysis of silicon tetrafluoride at elevated temperatures, thereby increasing the over-all net conversion of silicon fluoride to fine silica. Another important object is to provide a practical and economical method for obtaining a substantially pure and dry silicon tetrafluoride feed for the said hydrolysis reaction, thereby permitting much greater flexibility and choice of conditions for the hydrolysis reaction and potential savings in heat requirements and in size of equipment. Other objects of this invention will likewise appear from the detailed description of the process which follows.

As described in the above-mentioned patent the silica-forming reaction proceeds according to the following equation:

$$SiF_4 + 2H_2O \rightarrow SiO_2 + 4HF$$

The above reaction should be conducted at elevated temperatures since the reaction equilibrium favors the formation of silica under such conditions. The minimum reaction temperature should be above 1100° F., and preferably at least about 1200° F. Reaction temperatures above 1500° F. are required to approach reasonably complete reaction. Regardless, however, of the temperature at which the above reaction is, in fact, conducted, the economy of the process depends upon the efficient recovery of the by-product HF and any unreacted $SiF_4$ and effective reuse of these fluorides in supplying the $SiF_4$ feed for the vapor phase hydrolysis step.

Previously, the method of recovery and recycling that has been tried (see, for example, U.S. Patent No. 2,631,083 to Engelson et al.) involves the recovery of HF and $SiF_4$ in a water absorption system and subsequent reaction with siliceous raw material for as complete conversion as possible to $H_2SiF_6$. This dilute fluosilicic acid solution must then be concentrated and decomposed to provide $SiF_4$ vapors for the hydrolysis reaction.

However, as is well known, fluosilicic acid itself is highly unstable and has a significant vapor pressure even at fairly low concentrations. Thus, because of azeotrope formation, the maximum concentration of $H_2SiF_6$ which can be achieved by rectification of dilute acid is about 40% by weight, and because of inherent instability of the acid compound the practical maximum concentration is only about 30%. Consequently, the employment of fluosilicic acid as a silica producing raw material in a hydrolysis reaction requires the processing of about 2 mols of HF and 19 mols of water for each mol of ultimate raw material $SiF_4$. Obviously, then, a vast amount of heat is required to raise the temperature of the total mixture to the optimum range, about 1200° to 1500° F., most of which heat is wasted on elements thereof which do not contribute to the reaction. Furthermore, the presence of the HF in the hydrolysis zone is not favorable to the formation of silica.

It is obviously highly desirable to provide a method of recovering and recycling fluorides in which $SiF_4$ can be fed to the hydrolysis zone free of HF and excess attendant water. This is one of the accomplishments of the process of this invention. In fact, by means of the process of this invention, it is possible to feed substantially dry and, if desired, heated $SiF_4$ to the hydrolysis reaction, or to effect any desired degree of predilution thereof for flexibility and control of finished silica product quality.

Not only does my invention provide a concentrated $SiF_4$ feed stream to the hydrolysis zone but it also features improved efficiency, safety and completeness of recovery of by-product HF as well as of the unreacted $SiF_4$ from the hydrolysis reaction which accomplishments contribute extensively to the economic advantages of my novel process. It is, therefore, immediately apparent that my process constitutes an important advance in the art over prior art processes involving the use of fluosilicic acid as an intermediate raw material.

The novel process of this invention comprises the steps of hydrolyzing silicon tetrafluoride in the vapor state at elevated temperatures to obtain an aerosol of finely divided silica and gaseous products, separating the silica therefrom, and then scrubbing the gaseous products with an aqueous liquor containing siliceous raw material, e.g., silica (free and/or combined) and a relatively soluble fluoride salt, preferably potassium fluoride, to absorb and react with the $SiF_4$ and HF constituents in said gaseous products to form the corresponding, relatively insoluble fluosilicate salt, e.g., $K_2SiF_6$. The use of a fluoride salt, the solubility of which is several fold that of the corresponding fluosilicate, results in the formation of a fluosilicate salt which can be preferentially separated out of the scrubber effluent, washed if desired, calcined to drive off $SiF_4$ vapors which are returned as feed for the original hydrolysis step, and reincorporated in the scrubbing liquor for recycle and reuse. Once the process has been started, fluoride values can be recovered and recycled over and over again. The process is clearly suitable for continuous operation and is largely self-sustaining except for the continuous introduction of siliceous raw material to the scrubbing liquor and the addition of minor amounts of fluoride to make up inevitable losses from the system.

Going into more detail, the actual starting material for the process, that is, the crude siliceous raw material, is introduced into the process by merely mixing it into the scrubbing liquor which is being recycled for reuse. The raw material may be any suitable siliceous material such as diatomaceous earth, quartz, tripoli, glass sand, siliceous fluorspar, etc., i.e., preferably a relatively pure but normally coarse silica which is in plentiful supply. Since this siliceous raw material will be carried in the scrubbing liquor largely in the form of a suspension, it should be ground sufficiently fine for easy maintenance in this form. The scrubbing liquor will then generally consist of a slurry of siliceous raw material in an aqueous solution of the selected fluoride salt, which may be any having a solubility in water relative to that of the corresponding fluosilicate sufficiently great for efficient operation, preferably at least about 5 times greater. Suitable are fluorides of rubidium, aluminum, and sodium, for example, although potassium fluoride is clearly preferred because it is available at reasonable cost and is very soluble while potassium fluosilicate is only very slightly soluble and decomposes on heating within a convenient range of temperatures. Additional silica, water, and/or fluoride, e.g., in the form of hydrofluoric or fluosilicic acid, can also advantageously be added to the recycled scrubbing liquor to make up for any losses of same, although other addition points may serve as well for these make-up materials.

In the scrubbing zone the hydrolysis by-product gas stream from which the silica product has previously been recovered, is stripped as completely as possible of usable constituents. This involves absorption of hydrogen fluoride, unconverted silicon tetrafluoride and unrecovered silica in the scrubbing slurry described above, while the permanent gases such as nitrogen, hydrogen, oxygen, etc., and associated water vapors, etc., are discharged as waste from the top of the scrubber.

The scrubbing step, like most conventional gas absorption operations, can be carried out most practicably on a commercial scale at or near ordinary atmospheric pressure, although other pressures can, of course, be used and elevated pressures actually tend to increase absorption efficiency somewhat. The recovery of $SiF_4$ and $HF$ vapors by absorption, as with most gases, is also favored by conducting the scrubbing operation at reduced temperatures. However, in the present case substantially all of the $SiF_4$ and $HF$ vapors can be recovered by operating the scrubbing step at any temperature up to about the boiling point of water at the pressure in use. In fact, depending upon the amount of permanent gases in the by-product gases subjected to the scrubbing treatment and the amount of water vapor which one wishes to have carried out in said permanent gases discharging from the scrubber, it is often desirable to conduct the scrubbing operation at temperatures considerably above ambient temperatures. In any case, not only do the by-product gases generally contain some of the heat acquired in the hydrolysis step, but also, the absorption and subsequent reaction of $HF$ and $SiF_4$ in the scrubbing liquor generate still more heat. It is obvious then, that the temperature in the scrubbing zone naturally tends to rise. Therefore, another reason it may prove desirable to conduct the scrubbing operation at elevated temperatures, e.g., 120 to 200° F., is in order to avoid special cooling problems (of either the by-product gases, the recycled scrubbing slurry, or both).

The net result of the reaction of the absorbed $SiF_4$ and $HF$ with the siliceous raw material and the selected fluoride salt is, of course, the formation of the corresponding relatively insoluble fluosilicate. While the exact mechanism of the various reactions or reaction steps involved is not known, the results may be demonstrated by the following chemical equations:

$$SiF_4 + 2KF \rightarrow K_2SiF_6 \qquad (1)$$
$$4HF + SiO_2 + 2KF \rightarrow K_2SiF_6 + 2H_2O \qquad (2)$$

It should be emphasized that the above equations are merely indicative of the over-all changes involved and are not intended as explanations of the exact reaction mechanism. For example, it might be that the $SiF_4$ reacts first with $H_2O$ according to the reaction, $$3SiF_4 + 2H_2O \rightarrow 2H_2SiF_6 + SiO_2 \qquad (3)$$

and that the $H_2SiF_6$ then reacts with $KF$, thus:

$$2H_2SiF_6 + 4KF \rightarrow 2K_2SiF_6 + 2HF \qquad (4)$$

and that the $HF$ from (4) and that absorbed from the by-product gases react with $SiO_2$ from (3) and from the original scrubbing liquor to give:

$$6HF + SiO_2 \rightarrow H_2SiF_6 + 2H_2O \qquad (5)$$

the $H_2SiF_6$ thus formed then reacting with more $KF$ according to (4), and so on.

On the other hand, especially if the scrubbing liquor is alkaline, the most reactive silica may be in solution in the form of silicate ions ($SiO_3^=$) and the initial $HF$ reaction may be more properly written as follows:

$$6HF + SiO_3^= \rightarrow SiF_6^= + 3H_2O \qquad (6)$$

after which more suspended silica goes into solution and reacts, etc.

In any case, it will now be seen that the full amount of siliceous raw material required is supplied in combination with the solution of selected fluoride salt and that substantially all of the fluoride by-products from the hydrolysis reaction are thus effectively absorbed and safely and surely trapped in said combination scrubbing liquor because of their rapid reaction to form the corresponding insoluble fluosilicate. This insoluble fluosilicate can be easily separated from the liquid portion of the liquor as a wet solid, e.g., as a filter cake, which is an ideal physical condition for the next stages of handling, i.e. for reduction to dryness and use as a source of substantially dry $SiF_4$ for the hydrolysis reaction.

The filter cake as obtained from the scrubbing liquor is advantageously washed with water to remove unreacted excess metal fluoride which is returned to the process by adding the wash water to original filtrate while the washed filter cake is dried preferably at atmospheric pressure and a temperature at least slightly over 100° C. In any case, the filter cake, after drying, is calcined at above about 800° C. to decompose the fluosilicate and separate out the retained silicon tetrafluoride which is conducted as a substantially dry vapor to the hydrolysis step shortly to be described. The nonvolatilized remainder of the cake, now a glassy melt consisting mainly of silica, fluoride salt remaining from the decomposition of fluosilicate, and a small proportion of undecomposed fluosilicate is cooled, ground, reslurried in the aqueous filter effluent and recycled to make up of additional scrubbing slurry. This slurry now requires only replacement of the siliceous material reacted in the previous cycle and any lost fluorides in order to be restored to original scrubbing strength.

The silicon tetrafluoride vapors from the calcination of the filter cake are now fed to an appropriate hydrolysis reaction zone such as is described in the above-identified Engelson and Secord patent or in U.S. Patent No. 2,535,036, Broughton. The type of reactor employed for the hyrolysis step is not critical for the purposes of the process of this invention. Thus, hydrolysis may be effected by commingling the $SiF_4$ with superheated steam or with the water-containing products of combustion of hydrogen or other hydrogen-containing fuel (preferably gaseous), either in furnace or in an open flame impinged against a relatively cool surface. In any such process step the silicon tetrafluoride is hydrolyzed to finely divided silica as much as possible of which is separated from the gaseous products by appropriate known means such as cyclone separators, bag or ceramic filters and the like or adherence to the surface against which impinged.

The accompanying drawing is a flow diagram of a preferred embodiment of the process of this invention. In the following description of the process with reference to the drawing representative data are included on the quantitative flows involved for a typical commercial operation with potassium fluoride employed as a scrubbing medium, all values given being in lb.-mols/hr. unless otherwise stated.

A

Hydrolysis products formed in hydrolyzer 10 are, after separation of product silica in filter 12, conducted through line 14 to scrubber 16 with a composition of:

| | |
|---|---|
| $SiF_4$ | 4.2 |
| HF | 25.6 |
| $H_2O$ | 29.6 |
| $N_2$ | 78.8 |
| $SiO_2$ | 0.3 |

B

Exhaust gases discharged from scrubber 16 through flue 18 have a composition of:

| | |
|---|---|
| $N_2$ | 78.8 |
| $H_2O$ | 30.0 |
| $SiF_4$ | 0.2 |
| HF | 1.3 |

C

Scrubbing liquor is delivered from mixing and make-up tank 20 to scrubber 16 through inlet pipe 21 with a composition of:

| | |
|---|---|
| $SiO_2$ | 12.4 |
| $K_2SiF_6$ | 3.5 |
| KF | 40.15 |
| $H_2O$ | 463 |

D

Siliceous raw material (including make-up silica) and make-up fluoride and water are introduced into the system through pipe 23 in amounts of:

| | |
|---|---|
| $SiO_2$ | 6.3 |
| HF | 2.1 |
| $H_2O$ | 5.7 |

(These components are added most conveniently as about 6.0 lb. mols/hr. of silica and about 160 lbs./hr. of concentrated fluosilicic acid, i.e., about 31.5% by weight $H_2SiF_6$.)

E

The total amount of liquor discharged from the bottom of scrubber 16 consists of:

| | |
|---|---|
| $SiO_2$ | 6.6 |
| $K_2SiF_6$ | 13.6 |
| KF | 20 |
| $H_2O$ | 475 |

F

Of the liquor discharged from the bottom of scrubber 16, that not needed in the remainder of the process is recycled directly to slurry make-up tank 20. This stream consists of:

| | |
|---|---|
| $SiO_2$ | 1.2 |
| $K_2SiF_6$ | 2.5 |
| KF | 3.7 |
| $H_2O$ | 87.0 |

G

The remainder of the liquor from scrubber 16 which is not recycled is sent instead to filter 22. In the present example, the stream contains:

| | |
|---|---|
| $SiO_2$ | 5.4 |
| $K_2SiF_6$ | 11.1 |
| KF | 16.3 |
| $H_2O$ | 388 |

H

The water used to wash the resultant wet filter cake in filter 22 consists of:

| | |
|---|---|
| $H_2O$ | 135 |

I

The combined filtrate and wash water, i.e. the total filter effluent from filter 22 is returned to the mixing and make-up tank 20. This stream contains:

| | |
|---|---|
| $K_2SiF_6$ | 0.05 |
| KF | 12.9 |
| $H_2O$ | 370 |

J

The washed but still wet filter cake solids which are delivered from the filter 22 to dryer 24 contain:

| | |
|---|---|
| $SiO_2$ | 5.4 |
| $K_2SiF_6$ | 11.05 |
| KF | 3.4 |
| $H_2O$ | 153 |

K

The volatile matter driven off in the dryer, which is heated to about 150° C., consists of:

| | |
|---|---|
| $H_2O$ | 153 |

L

The dry solids charged to calciner 26 consist of:

| | |
|---|---|
| $SiO_2$ | 5.4 |
| $K_2SiF_6$ | 11.05 |
| KF | 3.4 |

M

The volatile matter driven off in calciner 26, which is operated at a temperature of about 800 to 1000° C., is conducted to the hydrolyzer 10 through conduit 28. This stream consists of:

| | |
|---|---|
| $SiF_4$ | 10.6 |

N

The fused solid residue from calciner 26 is cooled and sent to the grinder 30 after which it is returned through conduit 32 to the mixing and make-up tank 20. This stream consists of:

| | |
|---|---|
| $SiO_2$ | 5.4 |
| $K_2SiF_6$ | 0.45 |
| KF | 24.6 |

O

High temperature water vapor for the hydrolysis of the $SiF_4$ is supplied by burning hydrogen in the hydrolyzer 10 to which said $SiF_4$ is fed. The materials supplied to burners feed pipes 36, consist of:

| | | |
|---|---|---|
| $H_2$ | 42.4 | |
| $O_2$ | 24.2 | as air |
| $N_2$ | 78.8 | |

P

The solid finely-divided product collected in and removed from filter 12 consists of:

| | |
|---|---|
| $SiO_2$ | 6.0 |

It will be seen that, in the above example, the full strength scrubbing slurry (C) contains some excess silica and potassium fluoride over the stoichiometric requirement for reaction with all the $SiF_4$ and HF in the gas stream with which said slurry is contacted. Unreacted $SiO_2$ and KF, therefore, circulate continuously around throughout the scrubbing liquor cycle outlined above, e.g., in the liquor (F) recycled directly to the mixing and make-up tank 20 and in the filter effluent (I), etc. While the presence of such excess reactants tends to insure the maximum recovery of $SiF_4$ and HF from the gas stream subjected to the scrubbing treatment, it is not only feasible but may actually also be more economic in some instances to operate without such excess reactants. In fact, if the siliceous raw material contains appreciable amounts of nonsiliceous impurity of the type which forms insoluble fluorides, such for example as calcium or barium, it may be decidedly preferable to avoid any appreciable excess of silica in the scrubbing liquor system so that the insoluble fluoride can be recovered substantially free of silica.

The dotted lines in the drawing indicate how, in the case of such impure siliceous raw materials, the process could be modified by interposing a settling tank 38 between the grinder 30 and the make-up tank 20. The fluid effluent from the filter 22 would then be mixed with the ground material in tank 36 in order to take up soluble fluorides, etc., while the insoluble impurity would be settled out and discharged as waste through line 34.

Another technique which could be used for removing insoluble impurity from the system is the following. Two relatively large mix and make-up tanks 20 could be used in parallel with this stage of the operation being carried batchwise. That is, while one batch of slurry is being fed to the scrubber from one tank another batch would be prepared in the other. In this way the various recycle streams would be mixed together and the insoluble impurity settled out and removed before the make-up materials were added.

It should be pointed out that regardless of whether the make-up of the slurry is carried out continuously or batchwise, that portion of the slurry which is recycled directly from the bottom of the scrubber tower 16 can, if desired, be returned directly to the top of the tower instead of to the make-up and mix tank 20. Many other modifications of the process as illustrated in the accompanying drawings are possible as will be obvious to one skilled in the art, in view of the typical modifications described herein.

Although in the above example, fluosilicic acid is recommended as a particularly convenient form of adding make-up materials, particularly when silica, fluorides and water make-up are all required, it should be understood that the form in which these make-up materials may be added is not at all limited, although, of course, it is preferable that they be added in a form which is as free as possible from ingredients which tend to interfere or cause difficulties if present in the system. Moreover, in the above example, the raw material silica and the make-up materials are all shown as being added at one point, namely, the mixing and make-up tank 20. While such procedure is usually convenient, it is not necessary and it should be understood that introduction of ingredients can be made at many other points in the system. Thus, the raw material silica can be added at any point in the scrubbing liquor system, while the make-up materials can be added at almost any point in the entire system, provided they are in the proper form. For example, as gases or vapors, they can even be introduced into the gaseous stream of the system.

Having described my invention, together with preferred embodiments thereof, what I claim as new and desire to secure by U.S. Letters Patent is:

1. In a process for producing finely-divided silica by the hydrolysis of silicon fluoride in the vapor phase, the method of recovering and reusing the by-product, fluorine-containing gases from said hydrolysis reaction after their separation from the finely-divided solid silica product which comprises scrubbing the gases from said hydrolysis reaction with a fluid slurry formed by mixing a crude siliceous material with an aqueous solution of a fluoride salt of a metal selected from the group consisting of potassium, sodium, rubidium and aluminum thereby precipitating the fluorine values of said gases in the form of the relatively insoluble fluosilicate salt of said metal, filtering the liquid effluent from said scrubbing step to remove the precipitated and insoluble solids from the liquid portion of same, calcining said removed solids to decompose the fluosilicate salt of said metal contained therein into silicon fluoride vapors and a solid residue containing the fluoride salt of said metal, removing and recycling the substantially pure silicon fluoride vapors thus evolved to the said hydrolysis reaction, and recycling the solid residue of fluoride salt of said metal as well as the liquid filtrate removed from said scrubbing step effluent to the make-up of additional fluid slurry for said scrubbing step.

2. The process of claim 1 in which the metal is potassium.

3. The process of claim 1 in which the metal is sodium.

4. The process of claim 1 in which the metal is rubidium.

5. The process of claim 1 in which the metal is aluminum.

6. A process for converting crude siliceous raw material into finely-divided, substantially pure silica which comprises suspending said crude siliceous raw material in an aqueous solution of a fluoride salt of a metal selected from the group consisting of potassium, sodium, rubidium and aluminum to form a slurry, conducting a hydrolysis reaction of silicon fluoride vapors with water vapor at an elevated temperature to form finely-divided silica suspended in gaseous media containing by-product fluorine values, removing the finely-divided silica product from the said gaseous media, then scrubbing the said gaseous media with the original slurry of siliceous solids in an aqueous solution of fluoride salt of said metal prepared in the first step described above thereby converting the fluorine values in said gaseous media into the relatively insoluble fluosilicate salt of said metal, filtering the liquid effluent from said scrubbing step to remove the insoluble solids therefrom, recycling the filtrate to the above slurry make-up step, calcining the filtered-off solids to decompose said fluosilicate salt into silicon fluoride vapors and a solid residue of the fluoride salt of said metal, recycling the silicon fluoride vapors to said hydrolysis reaction step, and recycling the solid residue of the fluoride salt of said metal to the original slurry make-up step.

7. The process of claim 6 in which the metal is potassium.

8. The process of claim 6 in which the metal is sodium.

9. The process of claim 6 in which the metal is rubidium.

10. The process of claim 6 in which the metal is aluminum.

References Cited in the file of this patent

UNITED STATES PATENTS

| | | |
|---|---|---|
| 2,535,036 | Broughton | Dec. 26, 1950 |
| 2,631,083 | Engelson et al. | Mar. 10, 1953 |

OTHER REFERENCES

Mellor: "Comprehensive Treatise on Inorganic and Theoretical Chemistry," vol. VI, 1925, page 944.